(12) United States Patent
Nakajima (10) Patent No.: US 9,900,496 B2
(45) Date of Patent: Feb. 20, 2018

(54) ELECTRONIC DEVICE AND CONTROL METHOD FOR THE SAME

(71) Applicant: CANON KABUSHIKI KAISHA, Tokyo (JP)

(72) Inventor: Michinori Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/258,793

(22) Filed: Sep. 7, 2016

(65) Prior Publication Data
US 2017/0078613 A1   Mar. 16, 2017

(30) Foreign Application Priority Data

Sep. 11, 2015 (JP) .................. 2015-180121

(51) Int. Cl.
| | | |
|---|---|---|
| H04N 5/92 | (2006.01) | |
| H04N 9/80 | (2006.01) | |
| H04N 5/232 | (2006.01) | |
| H04N 5/765 | (2006.01) | |
| H04N 5/77 | (2006.01) | |
| H04N 9/82 | (2006.01) | |
| H04N 9/804 | (2006.01) | |

(52) U.S. Cl.
CPC ......... *H04N 5/23216* (2013.01); *H04N 5/765* (2013.01); *H04N 5/772* (2013.01); *H04N 9/8205* (2013.01); *H04N 9/8042* (2013.01)

(58) Field of Classification Search
CPC ..... H04N 5/9201; H04N 5/77; H04N 5/23216
USPC ................ 386/326, 239, 348, 337, 341
See application file for complete search history.

(56) References Cited

U.S. PATENT DOCUMENTS

2005/0102298 A1* 5/2005 Kawaguchi .......... G11B 27/034

FOREIGN PATENT DOCUMENTS

| JP | 2003188950 A | 7/2003 |
|---|---|---|
| JP | 2004273076 A | 9/2004 |
| JP | 2013098658 A | 5/2013 |

* cited by examiner

*Primary Examiner* — Robert Chevalier
(74) *Attorney, Agent, or Firm* — Canon U.S.A., Inc. IP Division (57) ABSTRACT

According to one embodiment of the present application, a mobile terminal displays, on a screen, an input screen for receiving additional information to be associated with an image, and receives additional information. The mobile terminal transmits the input additional information to a camcorder, according to a transfer instruction. While neither recording nor reproduction is performed, the camcorder associates the additional information from the mobile terminal, with a last recorded image when the last recorded image is not evaluated, and with a next image to be recorded when the last recorded image has been evaluated.

20 Claims, 6 Drawing Sheets

ELECTRONIC DEVICE AND CONTROL METHOD FOR THE SAME

BACKGROUND

Field

Aspects of the present invention relate to an electronic device which associates additional information with content and a control method for the same.

Description of the Related Art

In recent years, a small and light electronic imaging apparatus such as a digital still camera or a digital video camera for recording captured images in a memory card has been widely spread. Such an electronic imaging apparatus is configured to not only record a captured image but also record various additional information in association with the captured image (Japanese Patent Laid-Open No. 2004-273076). Such additional information includes text information, such as photographer information, shooting location information, and comments, in addition to shooting condition information, and is used as for example information for searching for a target image in editing operation.

Further, an electronic imaging apparatus having versatile communication means for wireless LAN or the like is also available in the market, and a personal computer (PC), or a personal digital assistant such as a tablet PC or a smartphone can access the electronic imaging apparatus. Japanese Patent Laid-Open No. 2003-188950 describes transmission of additional information edited using for example a tablet PC or a smartphone to an imaging apparatus using wireless communication. In the technique described in Japanese Patent Laid-Open No. 2003-188950, a user of an imaging apparatus selectively adds the transferred additional information to a recorded captured image, or to an image to be captured.

Japanese Patent Laid-Open No. 2013-098658 describes transferring of additional information to an imaging apparatus after selection and designation of an image (recorded captured image or image to be captured) with which the additional information is to be associated on tablet PC. Selection of the image with which the additional information, is to be associated is performed on the imaging apparatus, in the technique described, in Japanese Patent Laid-Open No. 2003-188950, and on the tablet PC, in the technique described in Japanese Patent Laid-Open. No. 2013-098658. This selection operation usually requires an instruction button providing instructions for selection of a recorded image or a future image to be recorded. In the personal digital assistant having a small screen, such as a smartphone, arrangement of such an instruction button is often made difficult. Even if a tablet PC having a screen of a certain size is employed, such an instruction button is preferably removed, in consideration of a relationship with other elements desired to be arranged. In addition, even if there is no problem of the size of the screen, a user needs to perform additional instruction operation (operation another button) depending on recording the additional information in the recorded image or in the future image to be recorded, and the additional instruction operation causes trouble. The problems may be similarly caused upon adding the additional information to content such as an audio file or a document file, in addition to adding the additional information to the image.

SUMMARY

An aspect of the present invention is to offer an electronic device for associating additional information with desired content with a further simple operation, and a control method for the same.

According to one embodiment, an electronic device includes an acquisition unit configured to acquire evaluation information having been associated with recorded content, an input unit configured to input additional information for content, and a control unit configured to perform control to record additional information input from the input unit to be associated with the recorded content, upon not acquiring evaluation information representing that the recorded content has been evaluated, by the acquisition unit, and record additional information input from the input unit to be associated with not the recorded content but content to be recorded, upon acquiring evaluation information representing that the recorded content has been evaluated, by the acquisition unit.

According to an embodiment, an electronic device communicably connected to a recording device configured to record content, includes an acquisition unit configured to acquire evaluation information having been associated with the recorded content, an input unit configured to input additional information for content, and a control unit configured to perform control to transmit to the recording device an instruction for recording additional information input from the input unit to associated with the recorded content, upon not acquiring evaluation information representing that the recorded content has been evaluated, by the acquisition unit, and transmit to the recording device an instruction for recording additional information input from the input unit to be associated with not the recorded content but content to be recorded, upon acquiring evaluation information representing that the recorded content has been evaluated, by the acquisition unit.

According to an embodiment, a recording device communicably connected to the electronic device, includes a control unit configured to perform control to record additional information input from the input unit to be associated with not recorded content but content to be recorded, when content is not recorded, even it an instruction for recording additional information input from the input unit to be associated with the recorded content is received from the electronic device.

Further features of aspects of the present invention will become apparent from the following description of exemplary embodiments (with reference to the attached drawings).

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which embodiments of the present invention are applied. Thus, the present invention is in no way limited to the following exemplary embodiment.

(Hereinafter, best modes for carrying out aspects of the present invention will be described in detail with reference to the accompanying drawings. It should be noted that embodiments described below are examples to implement aspects of the present invention, and should be modified or changed as needed depending on the configurations of apparatus and various conditions to which aspects of the present invention are applied, and the present invention is not limited to the following embodiments.)

Embodiments of the present invention will be described below in detail with reference to the drawings.

First Embodiment

Figure 1:
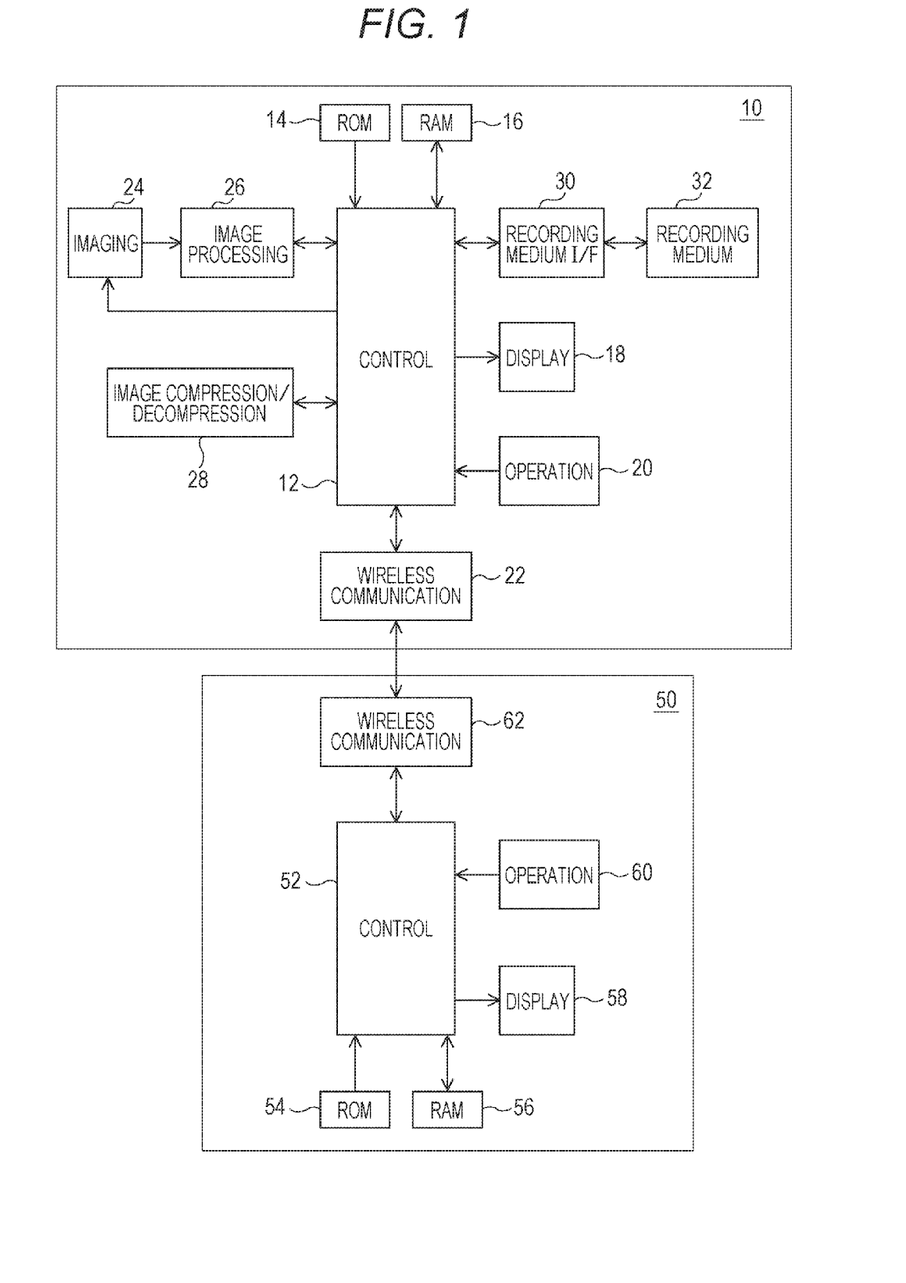
FIG. 1 is a block diagram of a schematic configuration according to an embodiment of the present invention.

FIG. 1 is a block diagram illustrating a schematic configuration of a system to which an electronic device according to an embodiment of the present invention is applied. The present system includes a digital video camera (camcorder) 10 obtained by integrating a video camera with an image recording device, and a mobile terminal 50 for inputting additional information to be recorded as metadata into a camcorder 10, in association with an image. The mobile terminal 50 is connected to the camcorder 10 through wireless communication such as WiFi® or Bluetooth®. The mobile terminal 50 is for example a portable PC, a tablet PC, or a smartphone, can operate the camcorder 10, and further can edit additional information, transfer the additional information to the camcorder 10, and designate an image with which the additional information is to be associated. The mobile terminal 50 can further acquire information representing whether the camcorder 10 is performing recording, from the camcorder 10, and below-mentioned evaluation information for an image recorded the camcorder 10.

A configuration of the camcorder 10 is described here. A control unit 12 totally controls a system of the camcorder 10. The control unit 12 loads a program stored in a ROM 14 into a RAM 16 and executes the program to control component units. The ROM 14 is a non-volatile data storage unit, and stores control programs executed by the control unit 12 and fixed data.

The RAM 16 is a volatile data storage unit temporary storing various data. The RAM 16 is used as a working memory of the control unit 12, a working area for compression/decompression processing by an image compression/decompression unit 28, and a VRAM for temporarily storing image data displayed on a display unit 18. The RAM 16 is also used as a unit for temporarily storing the additional information received from the mobile terminal 50 through a wireless communication unit 62 to associate the additional information with a captured image.

An imaging unit 24 as an image input unit has an imaging lens (including zoom lens and focus lens) and an image sensor, images an object based on the control by the control unit 12, and outputs image data constituting a still image or a motion image. An image processing unit 26 performs image processing, such as pixel interpolation, resizing, and color conversion processing on the image data output from the imaging unit 24. Furthermore, the image processing unit 26 calculates data required to control focus, exposure, and color balance of the imaging unit 24, based on the image data from the imaging unit 24, and supplies a result of the calculation to the control unit 12. The control unit 12 uses this calculation result from the image processing unit 26 to control focus, exposure, and automatic white balance of the imaging unit 24.

The image compression/decompression unit 28 compresses the image data subjected to the image processing in the image processing unit 26, and decompresses compressed image data (e.g., compressed image data read from a recording medium 32).

The display unit 18 displays for example various settings, an image captured by the imaging unit 24, and an image read from the recording medium 32 and reproduced, based on the control by the control unit 12. The display unit 18 is constituted as a display in a viewfinder and/or a liquid crystal monitor having variable angle.

The camcorder 10 has a recording medium I/F 30 to and from which the recording medium 32 such as a memory card can be mounted and dismounted. The recording medium I/F 30 records and reproduces the compressed image data in and from the recording medium 32, and also records and reproduces additional information associated with the images. The recording medium 32 records captured images as described below, and when a captured image has additional information, the recording medium 32 records the additional information in association with the captured image.

In the present embodiment, each captured image can be associated with the evaluation information representing evaluation of the captured image. The evaluation information may be recorded, as part of attribute information representing attributes of a corresponding image, in a management file associated with the captured image, or in a header portion of an image file. The evaluation information (or attribute information) may be recorded as part of the additional information, in a place or a file recording the additional information.

In the present embodiment, the evaluation information is binary information taking a value of "no evaluation" or "evaluation OK", for easy recognition, but of course may multivalued information representing multistep evaluation. The camcorder 10 associates the evaluation information of "no evaluation" with the captured image immediately after capture, as default. After shooting or reproduction, a user can operate the camcorder or the mobile terminal 50 to change the evaluation information to "evaluation OK". "Evaluation OK" also has a protection function, and the camcorder 10 rejects user's delete instruction for captured image having the evaluation information "evaluation OK". The user needs to change the evaluation information to "no evaluation" before delete operation to delete the captured image having the evaluation information "evaluation OK".

An operation unit 20 is an input device for receiving user's operation, and includes a power switch for turning on/off the camcorder 10, a shooting start button, a mode switching button for switching an operation mode such as a camera mode (shooting mode) or a reproduction mode, and the like. The operation unit 20 further includes a touch panel disposed to be overlaid on a display screen of the display unit 18 to output two-dimensional coordinate values according to a user's touch position.

Here, touching the touch panel using a finger or a stylus pen (hereinafter, referred to as "finger" for short) is called "touch-down". A state in contact with the touch panel using the finger is called "touch-on". Movement of the finger while in contact with the touch panel is called "move". Operation of removing the finger being in contact with the touch panel from the touch panel is called "touch-up". A state in which there is nothing in contact with the touch panel is called "touch-off". The control unit 12 detects these operations on the touch panel, acquires positional coordinates of a position on the touch panel at which the touch panel is in contact with the finger or the and determines which operation is performed on the touch panel. For the move, the control unit 12 can also determine a moving direction of the finger or the pen moving on the touch pan, based on a change in positional coordinates, for each of a vertical component and a horizontal component on the touch panel.

Sequential performance of the touch-down, the move over a certain distance, and the touch-up is defined as a stroke. Quick stroke operation is called flick. The flick is operation of quickly moving the finger while in contact with the touch panel over a certain distance and then removing the finger from the touch panel, in other words, operation of quickly moving the finger on the touch panel as if to swipe. When the move over a predetermined distance or more at a predetermined speed or more detected followed by detection of the touch-up, it can be determined that the flick has been performed. Furthermore, when the move over a predetermined distance or more at speed less than the predetermined speed is detected, it is determined that drag has been performed.

The touch panel includes various touch panels, such as resistive, capacitance, surface acoustic wave, infrared, electromagnetic induction, image recognition, and optical sensor touch panels, and any of them may be used.

A wireless communication unit 22 wirelessly communicates with an external device (here, the mobile terminal 50) having a corresponding communication unit, based on the control by the control unit 12, to transmit/receive various data including image data and character data, and control signals for various operations. For example, a wireless LAN or various near field radio communication systems are practically used therefor.

A configuration of the mobile terminal 50 is described here. A control unit 52 totally controls a system of the mobile terminal 50. The control unit 52 loads a program stored in a ROM 54 into a RAM 56 and executes the program to control component units. The ROM 54 is a non-volatile data storage unit, and stores control programs executed by the control unit 52 and fixed data. The RAM 56 is a volatile storage unit used as a working memory of the control unit 52.

A display unit 58 displays various settings and an image received from the camcorder 10, based on the control by the control unit 52.

An operation unit 60 is an input device for receiving user's operation, and includes a power switch for turning on/off the mobile terminal 50, and a touch panel. This touch panel has functions the same as those of the camcorder 10.

The wireless communication unit 62 wirelessly communicates with the wireless communication unit 22 of the camcorder 10, based on the control by the control unit 52, to transmit/receive various data including image data and character data, and control signals for various operations.

Figure 2:
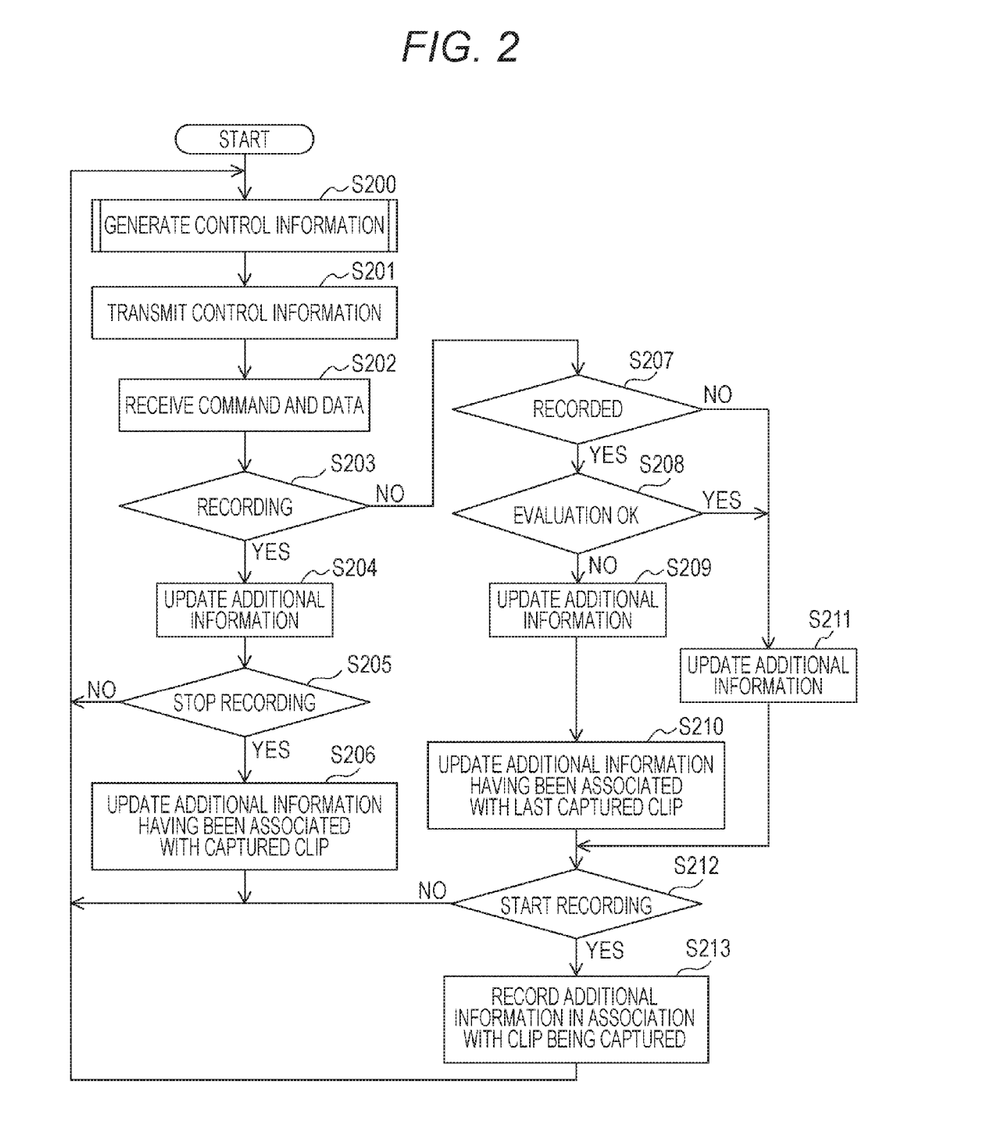
FIG. 2 is a flowchart of first control operation according to an embodiment of the present invention.

FIG. 2 is a flowchart of operation in a camera mode (shooting mode) of the camcorder 10. The control unit 12 loads a program stored in the ROM 14 into the RAM 16 and executes the program to achieve processing operations in the flowchart of FIG. 2. When the user selects a camera mode using the mode switching button of the operation unit 20, the control unit 12 starts the processing illustrated in FIG. 2.

In S200, the control unit 12 generates control information to be transmitted to the mobile terminal 50, according to settings of the camcorder 10. The control information represents a control state or an operation state of the camcorder 10, and includes operation mode information indicating the camera mode, the reproduction mode, a mode for reproduction performed in the camera mode (REC review mode), and the like. The control unit 12 monitors the camcorder 10 at specific intervals to obtain information for the control information, and stores the information in the RAM 16.

In S201, control unit 12 transmits the control information generated in S200 and stored in the RAM 16 to the mobile terminal 50, through the wireless communication unit 22.

In S202, the control unit 12 receives command and setting data for the camcorder 10 from the mobile terminal 50, through the wireless communication unit 22. The control unit 12 stores the data received at the wireless communication unit 22, in the RAM 16. The command received here is an instruction command for applying the setting data (additional information) received from the mobile terminal 50 as additional information to be associated with clip data.

In S203, the control unit 12 determines whether the camcorder 10 is performing recording. The control unit 12 determines, as the recording, for example a series of processing of output of captured image data from the imaging unit 24, image processing by the image processing unit 26, compression processing by the image compression/decompression unit 28, and recording to the recording medium 32. Clip data recorded in the recording medium 32 is not limited to motion image data, and may be still image data. When the recording is being performed in the camcorder 10, the control unit 12 proceeds to S204, and when the recording is not being performed in the camcorder 10, the control unit 12 proceeds to S207.

In S204, the control unit 12 updates the additional information currently set in the camcorder 10, stored in the RAM 16, with the setting data received in S202, and proceeds to S205. In S205, the control unit 12 determines whether the camcorder 10 stops the recording. For example, when a shooting stop button included in the operation unit 20 provides instructions for stopping the recording of motion image data, the camcorder 10 tops recording. When the camcorder 10 stops the recording, the control unit 12 proceeds to S206, and when the camcorder 10 does not stop the recording, the control unit 12 returns to S200 and repeats the processing in S200 and subsequent steps.

In S206, the control unit 12 updates additional information having been associated with captured clips. Data of the captured clips and the additional information having been associated with the data are recorded in the recording medium 32. The additional information having been associated with the captured clips recorded in the recording medium 32 is updated with the additional information recorded in the RAM 16. For example, when motion image clips are recorded to be stored in different folders, respectively, additional information is stored, as an xml file, in the same folder storing a clip with which the additional information is associated, and the additional information is associated with the clip. Association is not limited to this method, and the additional information may be recorded in a file having a file name with the same extension name as that of a file of a motion image clip with which the additional information is associated. Further, information (file name or the like) specifying the motion image with which the additional information is associated may be added in a header of the file of the additional information. Still further, information (file name or the like) specifying the file of the additional information to be associated with the motion image may be added in a header of a file of the motion image with which the additional information is associated. Still another further, the additional information may be directly recorded in the header of the file of the motion image (additional information may be recorded in the file itself of the motion image).

In S207, the control unit 12 checks whether clip data is recorded in the recording medium 32, through the recording medium I/F 30. When a clip is recorded, the control unit 12 proceeds to S208, and when the clip is not recorded, the control unit 12 proceeds to S211.

In S208, the control unit 12 analyzes the evaluation information of the recorded clip in the recording medium 32, through a recording medium I/F 30, and determines whether the evaluation information represents the "evaluation OK". When the evaluation information represents the "evaluation OK", the control unit 12 proceeds to S211. When the evaluation information does not represent the "evaluation OK", ("no evaluation"), the control unit 12 proceeds to S209.

Rewriting of the evaluation information is briefly described here. The user can use the operation unit 20 of the camcorder 10 or operate the mobile terminal 50 to provide instructions for rewriting the evaluation information to the camcorder 10. When detecting the instructions for rewriting to the "evaluation. OK", the control unit 12 updates the evaluation information of the recorded clip to have the "evaluation OK" through the recording medium I/F 30, and the evaluation information is rewritten.

The evaluation information may include other evaluation, for example, "evaluation NG" in addition to the "evaluation OK" and "no evaluation". In such a configuration, the motion image clip evaluated as the "evaluation NG" is considered to have been evaluated, although it is not evaluated as the "evaluation OK", and new additional information is not to be applied to the motion image clip evaluated as the "evaluation NG". This is because the evaluated clip is considered to be no longer an object to be evaluated. Therefore, for processing such ternary evaluation information, when the evaluation information represents the "evaluation OK" or "evaluation NG" in S208, the control unit 12 proceeds to S211, and otherwise ("no evaluation"), the control unit 12 proceeds to S209.

An evaluation value having an intermediate value between the "evaluation OK" and the "evaluation NG" may be set. For example, rating information, as a kind of attribute information, having several ranks may be employed for the evaluation information. The user can apply any value of for example five ranks to any of clips. When the user does not apply any of the values, a value "3" (intermediate value) is applied as a default. In this configuration, when any rating value other than "3" is applied in S208, the control unit 12 proceeds to S211, and otherwise ("3"), control unit 12 proceeds to S209. When the rating information has at least three ranks, the intermediate value is applied as the default, and evaluation is determined not to be performed.

In S209, the control unit 12 updates, similarly to S204, the additional information currently set in the camcorder 10, using the additional information received in S202.

In S210, the control unit 12 updates the additional information having been associated with the last recorded clip data of clip data recorded in the recording medium 32, with the additional information in the RAM 16, and proceeds to S212.

In S211, the control unit 12 updates, similarly to S204, the additional information currently set in the camcorder 10 with the additional information received in S202, and proceeds to S212. In this configuration, the additional information being associated with recorded clip data is not updated, and the updated additional information set in the camcorder 10 is associated with a clip subsequently captured.

In S212, the control unit 12 determines whether the camcorder 10 starts recording a captured image. When the camcorder 10 starts the recording, the control unit 12 proceeds to S213, and when the camcorder 10 does not start the recording, the control unit 12 returns to S200 and repeats the processing in S200 and subsequent steps.

In S213, the control unit 12 associates the additional information recorded in the RAM 16 with new clip data being captured and records the additional information in the recording medium 32. That is, the control unit 12 generates a new folder for storing a motion image file generated by newly started imaging to record data of a motion image being captured, and records, in the same folder, the additional information recorded in the RAM 16.

Figure 3:
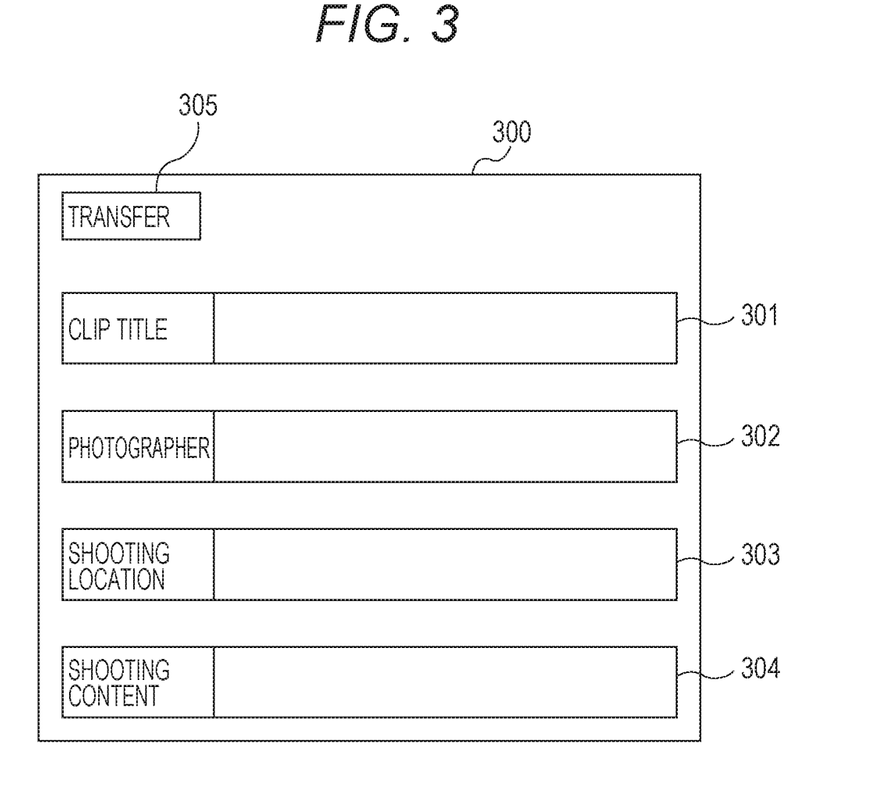
FIG. 3 is a diagram illustrating an example of an additional information input screen in a mobile terminal according to an embodiment of the present invention.

FIG. 3 is a diagram illustrating an example of a user interface (UI) of a Web application for creating data transmitted by the mobile terminal 50 to the camcorder 10, in S202. The control unit 52 of the mobile terminal 50 loads a program stored in the ROM 54 into the RAM 56 and executes the program to achieve this application. The UI 300 illustrated in FIG. 3 is displayed on the display unit 58. The control unit 52 receives user's operation of the operation unit 60, and displays response to the user's operation on the display unit 58. The control unit 52 stores data (additional information) input by the user through the operation unit 60, in the RAM 56, and wirelessly transmits the data to the camcorder 10. The camcorder 10 receives the data transmitted from the mobile terminal 50 in S202. In addition to the shooting condition information, the photographer information, shooting location information, the text information representing a shooting content, or the like can be input as the additional information. As the text information representing the shooting content, the user can input any character string, but for example, information for retrieval of a target image upon editorial operation, explanation comment for a scene of the clip, or information about a cast is input.

The UI 300 of the Web application includes a clip title edit box 301, a photographer name edit box 302, a shooting location edit box 303, a shooting content edit box 304, and a transfer button 305. The control unit 52 stores contents input into the edit boxes 301 to 304 in the RAM 56. When the user of the mobile terminal 50 presses the transfer button 305, the control unit 52 transfers, to the camcorder 10, the contents (additional information) input into the edit boxes 301 to 304, and a command for associating the additional information with clip data, through the wireless communication unit 62.

As described above, in the present embodiment, clip data with which the additional information is associated is changed depending on the operation state of the camcorder 10. Thus, the user does not need to particularly designate the object with which the additional information is to be associated.

Second Embodiment

Figure 4:
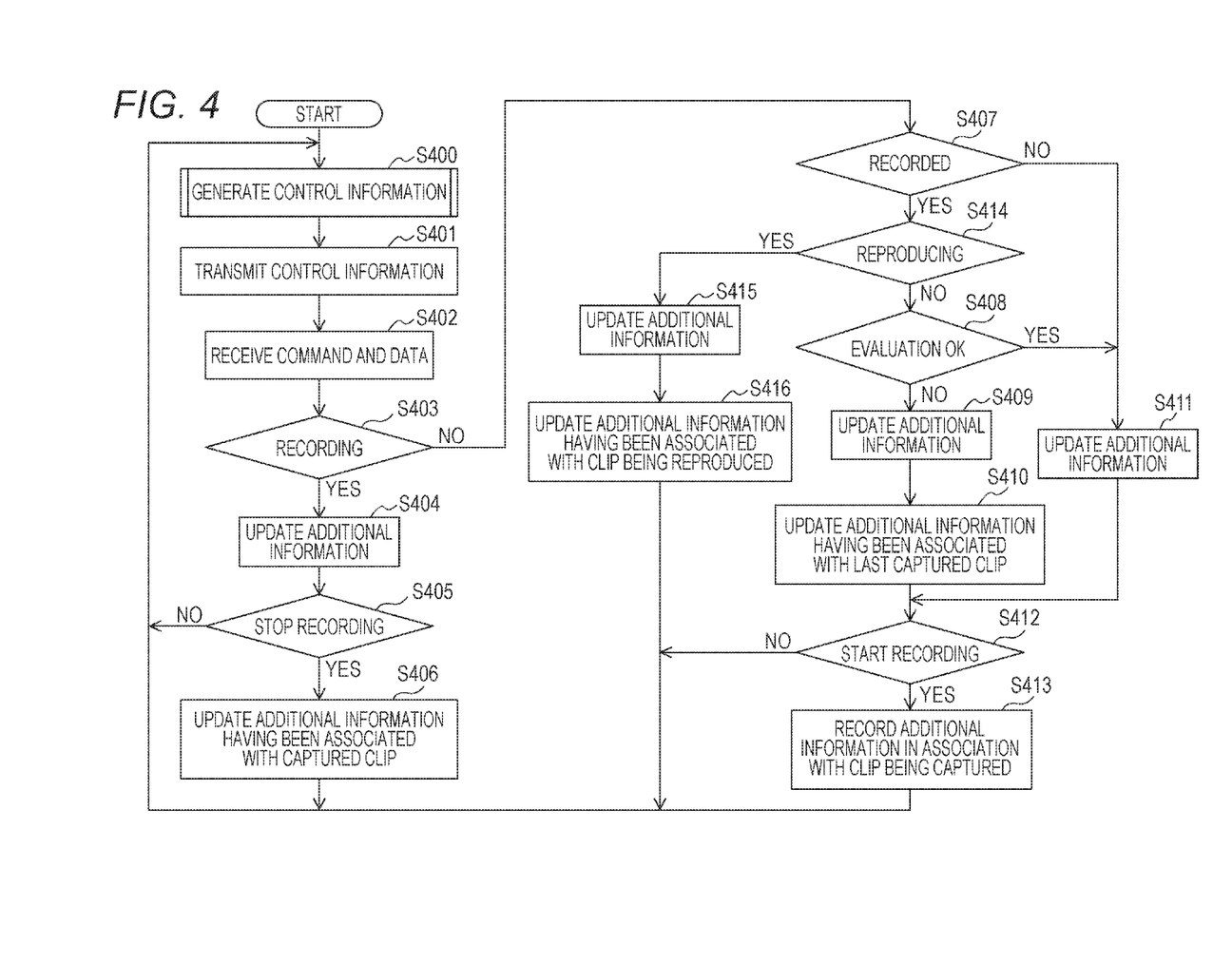
FIG. 4 is a flowchart of second control operation according to an embodiment of the present invention.

FIG. 4 is a flowchart illustrating control operation allowing update of additional information of arbitrary recorded clip data in the recording medium 32. Processing in S400 to S413 corresponds to processing in S200 to S213 of the flowchart illustrated in FIG. 2, and processing in S414 to S416 is added to the flowchart illustrated in FIG. 2. That is, in the flowchart illustrated in FIG. 4, S414 to S416 are inserted between S207 and S208 of the flowchart illustrated in FIG. 2

A control program for achieving the operation illustrated in FIG. 4 is stored in the ROM 14, and the control unit 12 loads the control program read from the ROM into the RAM 16 and executes the control program to achieve the control operation illustrated in FIG. 4. When the user selects the camera mode using the mode switching button of the operation unit 20, the control unit 12 starts the processing illustrated in FIG. 4.

Processing operations in S400 to S406 correspond to those in S200 to S206, respectively, and description thereof will be omitted.

When clip data is recorded in the recording medium 32 in S407, the control unit 12 proceeds to S414, and otherwise or when clip data is not recorded, the control unit 12 proceeds to S411.

In S414, the control unit 12 determines whether clip data recorded in the recording medium 32 is being reproduced. When clip data is being reproduced, the control unit 12 proceeds to S415, and when clip data is not being reproduced, the control unit 12 proceeds to S408. When clip data is being reproduced, the control unit 12 reads clip data from the recording medium 32 through the recording medium I/F 30, loads the clip data into the RAM 16, decompresses compressed data in the RAM 16, using the image compression/decompression unit 28, and outputs an image reproduced thereby to the display unit 18. Reproduction in S414 may include image reproduction using REC review to reproduce clip data in a camera mode, or normal image reproduction in a reproduction mode.

In S415, the control unit 12 updates, similarly to S204, the additional information currently set in the camcorder 10 with the additional information received in S402, and proceeds to S416. In S416, the control unit 12 updates additional information having been associated with the clip data recorded in the recording medium 32 and being currently reproduced. The clip being currently reproduced, and the additional information having been associated with the clip are recorded in the recording medium 32. The control unit 12 updates the additional information having been associated with the clip being currently reproduced, and recorded in the recording medium 32, with the additional information in the RAM 16. After the processing in S416, the control unit 12 returns to S400, and repeats the processing in S400 and subsequent steps.

Processing operations in S108 to S413 correspond to those in S208 to S213, respectively, and description thereof will be omitted.

In the control operation illustrated in FIG. 4, while the camcorder 10 reproduces a recorded clip, additional information having new contents is transmitted from the mobile terminal 50 to the camcorder 10, and the additional information of clip data being reproduced can be updated. Therefore, the additional information of any recorded clip can be updated with a simple operation.

Third Embodiment

Figure 5:
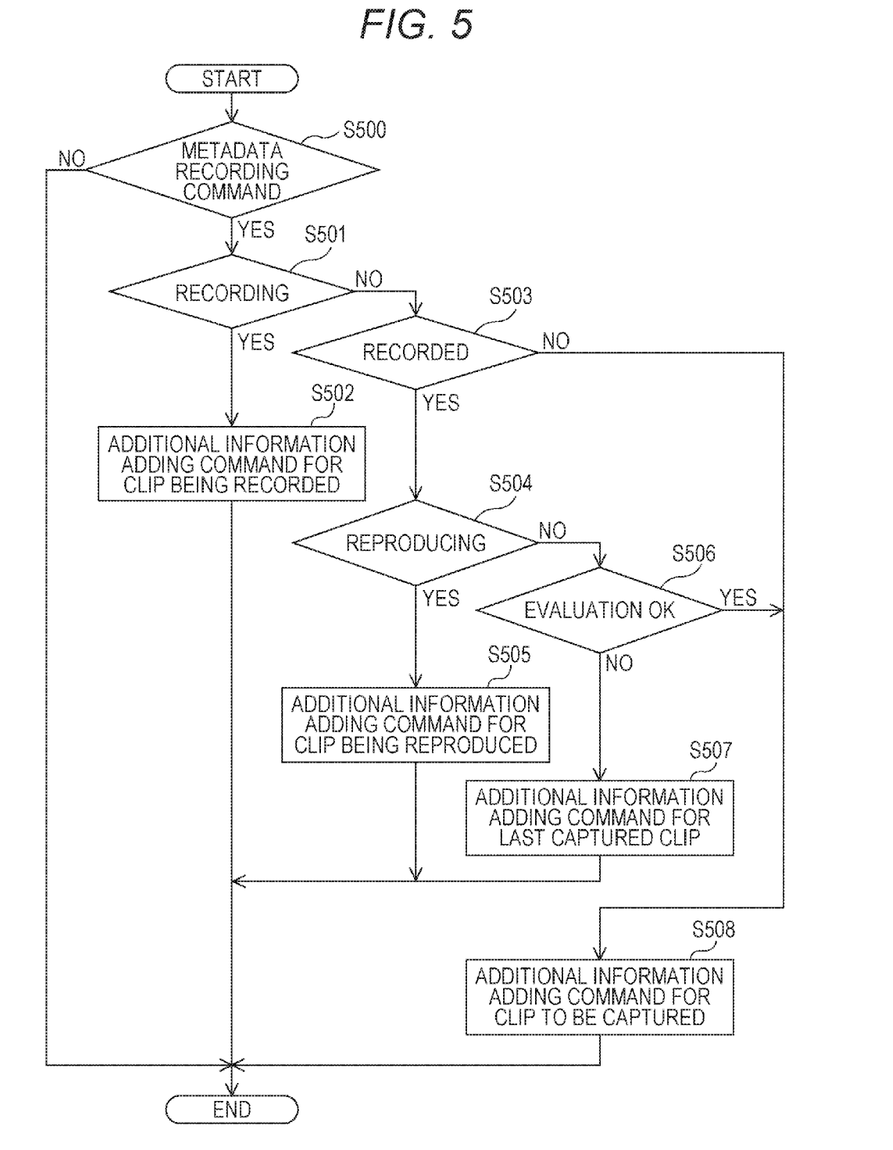
FIG. 5 is a flowchart of operation of a mobile terminal in third control operation.
Figure 6:
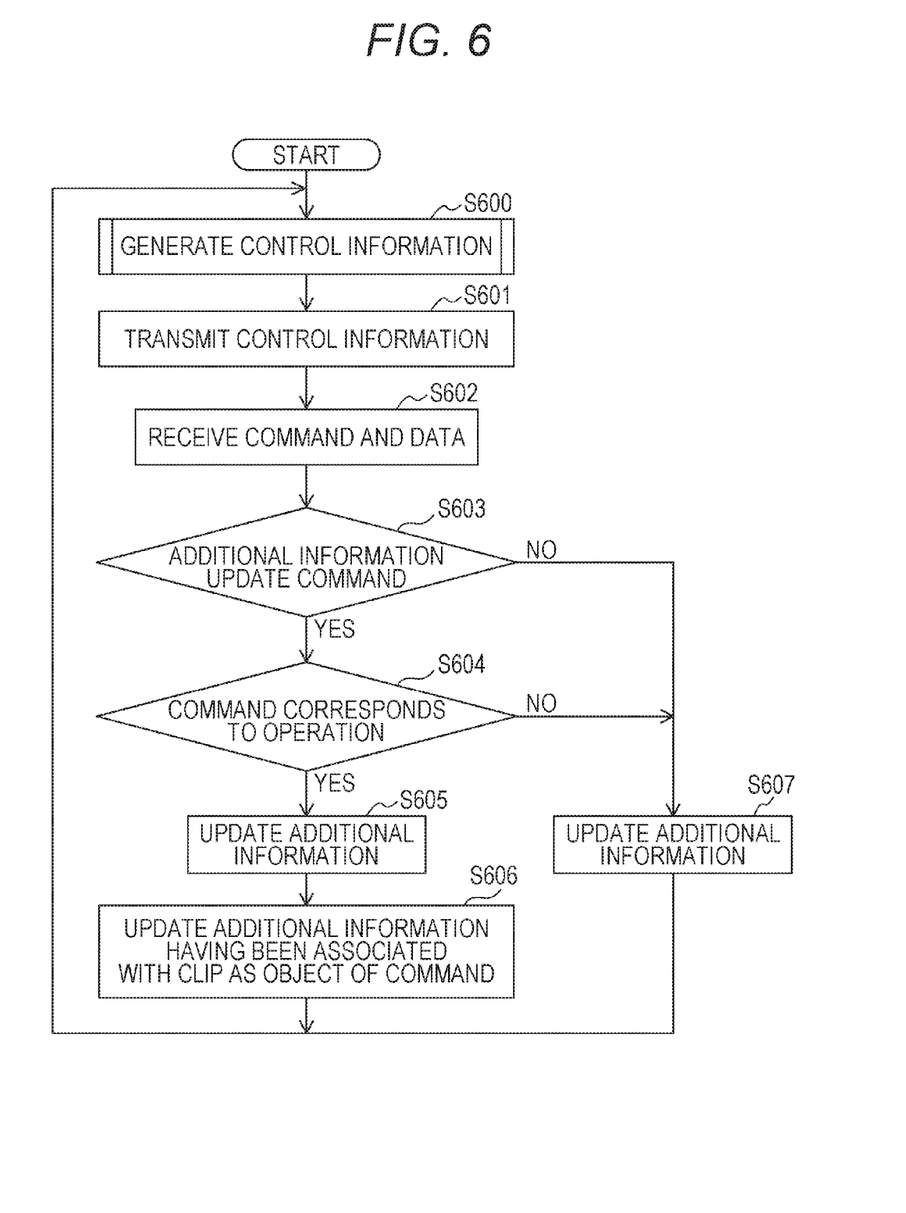
FIG. 6 is a flowchart of operation of a camcorder in the third control operation.

Description will be made of controlling for automatic selection or determination of a clip in the camcorder 10 to which additional information is to be added, based on recorded evaluation information, in the mobile terminal 50. FIG. 5 is a flowchart illustrating operation of the mobile terminal, and FIG. 6 is a flowchart illustrating operation of the camcorder 10. A control program for achieving the operation illustrated in FIG. 5 is stored in the ROM 54, and the control unit 52 loads the control program read from the ROM 54 into the RAM 56 and executes the program to achieve control operation illustrated in FIG. 5. Similarly, a control program for achieving the operation illustrated in FIG. 6 is stored in the ROM 14, and the control unit 12 loads the control program read from the ROM 14 into the RAM 16 and executes the control program to achieve control operation illustrated in FIG. 6.

The operation of the mobile terminal 50 will be described with reference to FIG. 5. The control unit 52 waits for operation of the user of the mobile terminal 50 to fill the edit boxes 301 to 304 and press the transfer button 305, in the UI 300 illustrated in FIG. 3.

In S500, the control unit 52 determines whether user's operation of the operation unit 60 is operation for requesting the camcorder 10 to transmit additional information to be associated with clip data (pressing of the transfer button 305). When the operation requests to transmit additional information, the control unit 52 proceeds to S501, and when the operation does not request to transmit additional information, the control unit 52 finishes the flowchart illustrated in FIG. 5.

In S501, the control unit 52 determines whether recording operation is being performed in the camcorder 10. When the recording is being performed in the camcorder 10, the control unit 52 proceeds to S502, and when the recording is not being performed in the camcorder 10, the control unit 52 proceeds to S503.

In S502, the control unit 52 transmits to the camcorder 10 a command for requesting addition of the information input into the edit boxes 301 to 304 as additional information, to the clip data being recorded. The information input into the edit boxes 301 to 403 by the user's operation of the operation unit 60 are stored in the RAM 56.

In S503, the control unit 52 determines whether clip data is recorded in the recording medium 32 of the camcorder 10. When clip data is recorded, the control unit 52 proceeds to S504, and when clip data is not recorded, the control unit 52 proceeds to S508.

In S504, the control unit 52 determines whether the camcorder 10 is reproducing clip data. When clip data is being reproduced, the control unit 52 proceeds to S505, and when clip data is not being reproduced, the control unit 52 proceeds to S506. In S505, the control unit 52 transmits to the camcorder 10 a command for requesting addition of the information input into the edit boxes 301 to 304 as additional information, to the clip data being reproduced.

In S506, the mobile terminal 50 requests the evaluation information of the last captured clip from the camcorder 10. The camcorder 10 analyzes the evaluation information of the last captured clip recorded in the recording medium 32, through the recording medium IF 30, and transmits the evaluation information to the mobile terminal 50. The following processing is similar to S208. When the evaluation information represents the "evaluation OK", the control unit 52 proceeds to S508, and otherwise, the control unit 52 proceeds to S507.

In S507, the control unit 52 transmits to the camcorder 10 a command for requesting addition of the information input into the edit boxes 301 to 304 as additional information, to the last captured clip data.

In S508, the control unit 52 transmits to the camcorder 10 a command for requesting addition of the information input into the edit boxes 301 to 304 as additional information, to clip data of an image to be captured.

After S502, S505, S507, and S508, the control unit 52 finishes the flowchart illustrated in FIG. 5.

As described above, the mobile terminal 50 automatically selects clip data to which the information input by the user are added, according to whether the last captured clap has the "evaluation OK", and requests the camcorder 10 to add the information input by the user.

Control operation of the camcorder 10 corresponding to the flowchart illustrated in FIG. 5 will be described with reference to FIG. 6.

In S600, the control unit 12 generates, similarly to S200, the control information to be transmitted to the mobile terminal 50, according to settings of the camcorder 10, and stores the control information in the RAM 16. In S601, the control unit 12 transmits the control information generated in S600 and stored in the RAM 16 to the mobile terminal 50, through the wireless communication unit 22.

Furthermore, when receiving an acquisition request for evaluation information of a clip from the mobile terminal 50, the control unit 12 analyzes the evaluation information of the clip recorded in the recording medium 32, through the recording medium IF 30 and transmits the evaluation information to the mobile terminal 50 through the wireless communication unit 22.

In S602, the control unit 12 receives command and setting data for the camcorder 10 from the mobile terminal 50 through the wireless communication unit 22. The control unit 12 stores the data received at the wireless communication unit 22, in the RAM 16. The command received here is a command generated and transmitted by the mobile terminal 50, according to the flowchart illustrated in FIG. 5.

In S603, the control unit 12 determines whether the command received from the mobile terminal 50 is an additional information update command instructing update of the additional information of the recorded clip including the clip being recorded. When the command is determined as a command for adding the additional information to the clip being recorded, the clip being reproduced, or the last captured clip, as an object having additional information to be updated the command corresponds to the additional information update command, and the control unit 12 proceeds to S604. Otherwise, when the command is determined as a command for adding the additional information to a clip of the image to be captured the command does not corresponds to the additional information update command, and the control unit 12 proceeds to S607.

In S604, the control unit 12 determines whether command received from the mobile terminal 50 corresponds to the current operation of the camcorder 10. For cases where the command from the mobile terminal 50 is the command for adding the additional information to the clip being recorded, when the camcorder 10 is recording the clip, a YES result is obtained, and when the camcorder 10 is not recording the clip, a NO result is obtained. For cases where the command from the mobile terminal 50 is the command for adding the additional information to clip data being reproduced, when the camcorder 10 is reproducing a clip, a YES result is obtained, and when the camcorder 10 is not reproducing a clip, a NO result is obtained. For cases where the command from toe mobile terminal 50 is the command for adding the additional information to the last captured clip data, when clip data is recorded in the recording medium 32, a YES result is obtained, and otherwise, a NO result is obtained. When the command and the operation of the camcorder 10 corresponds to each other, the control unit 12 proceeds to S605, and otherwise, the control unit 12 proceeds to S607.

In S605, the control unit 12 updates, similarly to S204, the additional information currently set in the camcorder 10, with the additional information received in S602, and proceeds to S606. In S606, the control unit 12 updates the additional information having been associated with a target clip of the received command, with the data received from the mobile terminal 50 in S602, and returns to S600. When the target clip does not have additional information to be updated, the data received from the mobile terminal 50 is associated with target clip data as the additional information.

In S607, the control unit 12 updates, similarly to S204, the additional information currently set in the camcorder 10 with the additional information received in S602, and return to S600.

Owing to the control illustrated in FIGS. 5 and 6, in the mobile terminal 50, automatic selection or determination of a clip in the camcorder 10, to which the additional information is to be added, is allowed according to the condition of the camcorder 10.

For the control by the control units 12 and 52, a Single hardware device may perform control, or a plurality of hardware devices may also share processing to control the apparatus as a whole.

Aspects of the present invention have been described above used on the preferred embodiments of the present invention, but the present invention is not limited to these specific embodiments, and various modes are included in the present invention without departing from the scope and spirit of the present invention. Furthermore, the embodiments of the present invention are illustrative only, and the embodiments may be appropriately combined with each other.

In the embodiments described above, aspects of present invention, which are applied to the image captured by the imaging apparatus has been described as an example, but the present invention is not limited to these examples, and can be applied to a recording system, or apparatus for associating information, with content such as image including a still image or motion image, voice (music), or text in the embodiments described above, association of the additional information with the image (motion image) has been exemplified as an, example, but the present invention can be also applied to add the additional information to content which may be associated with the evaluation information, such as voice (music), or text, in addition to the image. Further, the present invention may be applied to various apparatuses which can be operated as such a recording system or apparatus. For example, the apparatuses include personal computers, PDAs, cellular phone terminals, portable image viewers, printers with a display, digital photo frames, music players, game consoles, or electronic book readers.

According to aspects of the present invention, a burden on the user selecting content with which the additional information is to be associated can be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s) The computer may comprise one or more of a central processing unit CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180121, filed Sep. 11, 2015, which is hereby incorporated, by reference herein in its entirety.

What is claimed is:

1. An electronic device comprising:
   an acquisition unit configured to acquire evaluation information having been associated with recorded content;
   an input unit configured to input additional information for content; and
   a control unit configured to perform control to record additional information input from the input unit to be associated with the recorded content, upon not acquiring evaluation information representing that the recorded content has been evaluated, by the acquisition unit, and record additional information input from the input unit to be associated with not the recorded content but content to be recorded, upon acquiring evaluation information representing that the recorded content has been evaluated, by the acquisition unit.

2. The electronic device according to claim 1, wherein the acquisition unit acquires evaluation information associated with the last recorded content, and the control unit determines content to be recorded in association with the additional information input from the input unit, based on evaluation information associated with the last recorded content.

3. The electronic device according to claim 1, wherein when additional information is input by the input unit while content is being recorded, the control unit performs control to record the input additional information to be associated with the content being recorded, regardless of evaluation information of the recorded content.

4. The electronic device according to claim 1, wherein when additional information is input by the input unit while content is being reproduced, the control unit performs control to record the input additional information to be associated with content being reproduced regardless of evaluation information of the recorded content.

5. The electronic device according to claim 1, wherein when additional information is input by the input unit while content has not been recorded, the control unit performs control to record the input additional information to be associated with content to be recorded, regardless of evaluation, information of the recorded content.

6. The electronic device according to claim 1, wherein the input unit is a unit configured to receive additional information from an external device.

7. The electronic device according to claim 1, further comprising a record control unit configured to perform control to record the content in a recording medium.

8. The electronic device according to claim 1, further comprising an evaluation recording unit configured to record evaluation information obtained based on user's operation to be associated with recorded content.

9. An electronic device communicably connected to a recording device configured to record content, the electronic device comprising:
   an acquisition unit configured to acquire evaluation information having been associated with the recorded content;
   an input unit configured to input additional information for content; and
   a control unit configured to perform control to transmit to the recording device an instruction for recording additional information input from the input unit to be associated with the recorded content, upon not acquiring evaluation information representing that the recorded content has been evaluated, by the acquisition unit, and transmit to the recording device an instruction for recording additional information input from the input unit to be associated with not the recorded content but content to be recorded, upon acquiring evaluation information representing that the recorded content has been evaluated, by the acquisition unit.

10. The electronic device according to claim 1, wherein the evaluation information is any of information representing no evaluation and information representing evaluation OK, the information representing no evaluation is evaluation information representing that content is not evaluated, and the information representing evaluation OK is evaluation information representing that content has been evaluated.

11. The electronic device according to claim 1, wherein the evaluation information is any of information representing no evaluation, information representing evaluation OK, and information representing evaluation NG, the information representing no evaluation is evaluation information representing that content is not evaluated, and the information representing evaluation and the information representing evaluation NG are evaluation information representing that content has been evaluated.

12. The electronic device according to claim wherein the evaluation information is rating information having at least three ranks, and a rating of a default value added when there is no user's operation for adding a rating is evaluation information representing that content is not evaluated, and ratings other than the default value is evaluation information representing that content has been evaluated.

13. The electronic device according to claim wherein the content is at least one of image, voice, music, and text.

14. The electronic device according to claim wherein the content is an image, the electronic device further comprising:
   an imaging unit; and
   a record control unit configured to perform control to record an image captured by the imaging unit in a recording medium, and
   the acquisition unit acquires evaluation information associated with the last recorded image in the recording medium.

15. The electronic device according to claim 14, wherein the content is a motion image.

16. A recording device communicably connected to the electronic device according to claim 9, the recording device comprising a control unit configured to perform control to record additional information input from the input unit to be associated with not recorded content but content to be recorded, when content is not recorded, even if an instruction for recording additional information input from the input unit associated with the recorded content is received from the electronic device.

17. A control method for an electronic device comprising:
acquiring evaluation information having been associated with recorded content;
inputting additional information for content; and
performing control to record additional information input in the inputting to be associated with the recorded content, upon not acquiring evaluation information representing that the recorded content has been evaluated, in the acquiring, and record additional information input in the inputting to be associated with not the recorded content but content to be recorded, upon acquiring evaluation information representing that the recorded content has been evaluated, in the acquiring.

18. A control method for an electronic device communicably connected to a recording device for recording content, the method comprising:
acquiring evaluation information having been associated with the recorded content;
inputting additional information for content; and
performing control to transmit to the recording device an instruction for recording additional information input in the inputting to be associated with the recorded content, upon not obtaining evaluation information representing that the recorded content has been evaluated, in the acquiring, and transmit to the recording device an instruction for recording additional information input in the inputting to be associated with not the recorded content but content to be recorded, upon obtaining evaluation information representing that the recorded content has been evaluated, in the acquiring.

19. A non-transitory computer-readable recording medium having a program stored therein, the program being configured to cause a computer to function as units of the electronic device according to claim 1.

20. A non-transitory computer-readable recording medium having a program stored therein, the program being configured to cause a computer to function as units of the electronic device according to claim 9.

* * * * *